US007146632B2

(12) United States Patent
Miller (10) Patent No.: US 7,146,632 B2
(45) Date of Patent: Dec. 5, 2006

(54) INTERACTIVE INFORMATION AGGREGATOR FOR AN INTERACTIVE TELEVISION SYSTEM

(75) Inventor: Douglas Allyn Miller, Seattle, WA (US)

(73) Assignee: Digeo, Inc., Kirkland, WA (US)

( * ) Notice: Subject to any disclaimer, the term of this patent is extended or adjusted under 35 U.S.C. 154(b) by 1043 days.

(21) Appl. No.: 09/878,139

(22) Filed: Jun. 8, 2001

(65) Prior Publication Data

US 2002/0188958 A1   Dec. 12, 2002

(51) Int. Cl.
*H04N 1/173* (2006.01)

(52) U.S. Cl. ................... 725/114; 725/100; 725/112; 725/116; 725/130

(58) Field of Classification Search .............. 725/9, 725/32, 46, 112, 114, 116, 135, 136, 100, 725/130; 709/251–253
See application file for complete search history.

(56) References Cited

U.S. PATENT DOCUMENTS

| 4,814,883 A | 3/1989 | Perine et al. |
| 4,829,372 A | 5/1989 | McCalley et al. |
| 4,888,638 A | 12/1989 | Bohn |
| 4,974,085 A | 11/1990 | Campbell et al. |
| 5,029,014 A | 7/1991 | Lindstrom |
| 5,099,319 A | 3/1992 | Esch et al. |
| 5,233,423 A | 8/1993 | Jernigan et al. |
| 5,600,366 A | 2/1997 | Schulman |
| 5,661,516 A | 8/1997 | Carles |
| 5,715,018 A | 2/1998 | Fasciano et al. |
| 5,745,837 A | 4/1998 | Fuhrmann .................... 455/5.1 |
| 5,774,170 A | 6/1998 | Hite et al. |
| 5,774,664 A | 6/1998 | Hidary et al. |
| 5,774,666 A | 6/1998 | Portuesi |
| 5,790,806 A | 8/1998 | Koperda ................ 395/200.82 |
| 5,986,692 A | 11/1999 | Logan et al. |
| 6,061,719 A | 5/2000 | Bendinelli et al. |
| 6,064,420 A | 5/2000 | Harrison et al. .............. 348/12 |
| 6,141,010 A | 10/2000 | Hoyle |
| 6,177,931 B1 | 1/2001 | Alexander et al. |
| 6,215,483 B1 | 4/2001 | Zigmond |
| 6,230,203 B1 | 5/2001 | Koperda et al. ............ 709/229 |

(Continued)

FOREIGN PATENT DOCUMENTS

WO   WO 99/55066 A1   10/1999

OTHER PUBLICATIONS

Sanders, E., "TV Ads Will Soon Be Watching You," *Seattle Times*, Jun. 12, 2001.

(Continued)

*Primary Examiner*—Kieu-Oanh Bui
(74) *Attorney, Agent, or Firm*—Darby & Darby PC; Bruce E. Black (57) ABSTRACT

An interactive information aggregator is provided for off-broadcast access to trigger information, which can include interactive television triggers, accompanying content and data, network addresses. The aggregator can be implemented in an interactive television system so as to perform real-time capture and aggregation of trigger information through cooperation with content providers, use of a network of collection devices deployed in the interactive television system, or generation of trigger information by third-party entities. The aggregated information can then be made available to ancillary devices used by viewers, independently of being provided to a set top box and television. For instance, the aggregated information can be provided to ancillary devices that do not have direct access or capability to process television broadcast signals. This provides users of the ancillary devices with the capability to participate in an interactive television experience where they would otherwise not have such interactive capability.

32 Claims, 5 Drawing Sheets

U.S. PATENT DOCUMENTS

| | | |
|---|---|---|
| 6,233,389 B1 | 5/2001 | Barton et al. |
| 6,240,555 B1 | 5/2001 | Shoff et al. |
| 6,252,952 B1 | 6/2001 | Kung et al. .................. 379/111 |
| 2001/0025377 A1 | 9/2001 | Hinderks |
| 2001/0050920 A1* | 12/2001 | Hassell et al. .............. 370/465 |
| 2002/0124246 A1* | 9/2002 | Kaminsky et al. .............. 725/9 |
| 2002/0144262 A1* | 10/2002 | Plotnick et al. ................ 725/32 |
| 2002/0194589 A1* | 12/2002 | Cristofalo et al. ............ 725/32 |
| 2005/0015796 A1* | 1/2005 | Bruckner et al. ............. 725/32 |

OTHER PUBLICATIONS

"CLARIA—A Leader in Online Behavioral Marketing," retrieved May 26, 2004, from http://www.claria.com (formerly http://www.gator.com).

Office Action dated Jun. 1, 2005, cited in related Patent Application No. 09/883,098.

* cited by examiner

INTERACTIVE INFORMATION AGGREGATOR FOR AN INTERACTIVE TELEVISION SYSTEM

TECHNICAL FIELD

This disclosure relates generally to interactive television systems, and in particular but not exclusively, relates to aggregation of interactive television information that can be provided to ancillary client terminals.

BACKGROUND

A growing number of television content sources enable interactive television. When operational, interactive television provides useful e-commerce, advertising, and information capabilities to viewers. One mechanism for interactivity typically involves the insertion of information or data in hidden portions of a television video signal. This information can range from a simple web link, such as an Internet uniform resource locator (URL) address, to a fairly complete set of extensible markup language (XML) information that can form a complex web page accompanied by web links (e.g., to advertisers' web pages). Advanced Television Enhancement Forum (ATVEF) triggers or triggering techniques by Wink are examples of mechanisms for providing interactive information along with television signals.

This information (e.g., triggers and accompanying content and data, which will be referred to collectively herein as "trigger information") is typically inserted or carried in a vertical blanking interval (VBI) portion of an analog television video signal. For digital television broadcasts, this trigger information may be inserted into a special data slice of an MPEG-2 bit stream or signal. Modern analog/digital set top boxes or other client terminals can decode these signals to obtain the trigger information, and with the appropriate enabling software, convert the trigger information into a rich interactive experience for the viewer.

Unfortunately, typical interactive television systems leave the interactive experience under the exclusive control of content providers. The cable service provider or multiple system operator (MSO) has limited opportunity to customize or enhance that experience for the viewer. In other words, because the content providers are typically the parties that provide and insert the trigger information into the television signals, the MSO's role is often reduced to simply relaying the television signals to viewers without any modification or customization.

In addition, due to the embedded nature of interactive trigger information, only the set top box has the capability to access and process the trigger information in order to provide an interactive experience for the viewer. This is inconvenient to viewers that wish to view and or otherwise have an interactive experience via use of devices other than the set top box and television. These ancillary devices can include a personal computer (PC), handheld display device, companion set top boxes, or other client terminals different from the set top box. Ancillary devices that are connected to the Internet, through a cable modem for instance, cannot process the trigger information unless they have the same hardware and software as set top boxes that can detect and process the trigger information. This limits the interactive experience of users of these "legacy" ancillary devices.

While it may be possible to provide ancillary devices with the hardware and software to process trigger information, such advanced devices are costly and require their own wired coaxial cable connection to the cable distribution plant. This makes the interactive experience of users of these ancillary devices less practical and less convenient, as well as still leaving the ultimate control of any interactive experience in the hands of content providers.

Accordingly, improvements are needed in techniques for providing interactive information to viewers.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of an information aggregator for an interactive television system are described herein. In the following description, numerous specific details are given to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview, one embodiment of the invention provides an interactive information aggregation presence on the Internet or other location for off-broadcast access to trigger information, which can include interactive television triggers, accompanying content and data, addresses such as URL addresses, and the like. An embodiment of the invention can be implemented as an interactive television system that can perform real-time capture and aggregation of trigger information through cooperation with content providers, use of a network of collection devices deployed in the interactive television system, or generation of trigger information (including interactive content) by third-party entities.

The aggregated information can then be made available across the Internet in a form that is customized for a viewer's local channel lineup in one embodiment, or otherwise made available to viewers independently of a set top box and television. For instance, the aggregated information can be provided to ancillary devices that do not have direct access or capability to process television broadcast signals. This provides users of the ancillary devices or other legacy devices with the capability to participate in an interactive television experience where they would otherwise not have such interactive capability.

Figure 1:
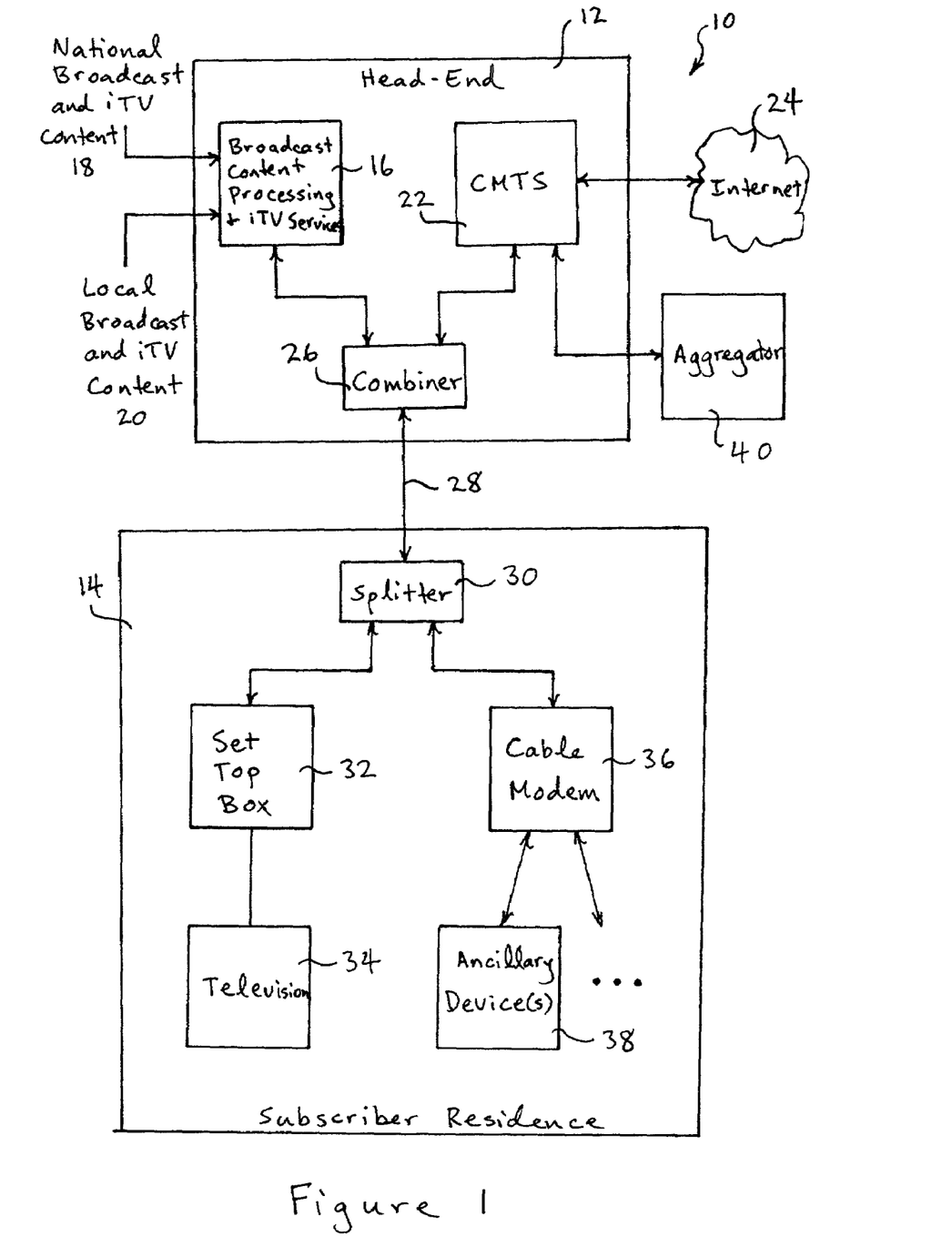
FIG. 1 is a block diagram of a system that can implement an embodiment of the invention.

Referring first to FIG. 1, shown generally at 10 is an interactive television system that can implement an embodiment of the invention. The system 10 includes one or more broadcast centers, such as head-ends 12 for a cable distribution system or broadcast centers for satellite delivery systems (discussed later below), to distribute television broadcast content and interactive television (sometimes referred to as "iTV") content to a plurality of subscriber residences 14. The head-end 12 includes broadcast content processing and iTV services hardware and software (including processors, servers, storage media, databases, and so on), which are shown generally in FIG. 1 as a unit 16. The unit 16 can receive national broadcast content and iTV content 18 from content providers, satellite feeds, servers, or other sources. The unit 16 can also receive local broadcast content and iTV content 20 from parties such as local studios, servers, content providers, or other sources.

A cable modem termination system (CMTS) 22 provides the head-end 12 (and ultimately the subscriber residences 14) with access to the Internet 24. A combiner 26 places the signals and/or data provided by the unit 16 and the CMTS into appropriate channels of a communication network 28. In accordance with an embodiment of the invention, the communication network 28 can comprise a hybrid fiber-coaxial cable distribution network comprising channels having a bandwidth of 6 MHz. Some of these channels of the communication network 28 are used to carry television signals (which may be accompanied by interactive content and other trigger information), while other channels are used for upstream and downstream communication of data with the Internet 24.

Examples of techniques that can be used to provide interactive content and other trigger information from the unit 16 to set top boxes in the subscriber residences 14, via channels of the communication network 28, include MPEG methods that multiplex special data stream(s) into the digital video transport stream, encoding/embedding data in the VBI portion of the analog television video signals (e.g., ATVEF triggers), using out-of-band modems (e.g., Digital Audio-Visual Council or "DAVIC" modems) to provide the interactive content, and other such techniques that provide information related to the content of the television signals. For the channels of the communication network 28 that are used for communication of data to and from the Internet 24, protocols such as Data Over Cable Service Interface Specifications (DOCSIS), transmission control protocol/Internet protocol (TCP/IP), hypertext transfer protocol (HTTP), file transfer protocol (FTP), or other suitable protocols/techniques may be used.

At the residence 14, a splitter 30 is coupled to receive the television signals (including interactive content and other trigger information) from the communication network 28. The splitter 30 sends the received television signals (including interactive content and other trigger information) to a first client terminal, such as a set top box 32, which subsequently sends the signals and other information to a television 34. As will be understood by those skilled in the art, the set top box 32 includes components such as digital/analog video processing unit(s), VBI decoders, central processing units, memory, video graphics processing unit(s), software, and other components that can detect, extract, and process trigger information and other interactive content that is received from the communication network 28. For instance, these components can extract URL addresses from the trigger information and present the URL addresses as hypertext links or other visual indicator on the television 34, which the viewer can "click" to connect to the Internet 24. These components and the specifics of their operation are not shown in FIG. 1 or described in further detail herein for the sake of simplicity of explanation.

Typically, a viewer of the television 34 can view television programs and experience interactive television via use of a remote control (not shown) that communicates with the set top box 32. Examples of such interactivity with the television 34 and set top box 32 include being presented with or accessing supplementary information that may accompany a television program by "clicking" on an on-screen icon that is displayed via use of triggers, conducting e-commerce by clicking on on-screen menus or icons that are activated by triggers, navigation of the set top box 32 to a URL address on the Internet 24 in response to the viewer's "clicking" of an on-screen icon, and so on.

In many implementations, such as what is typical in a legacy system, the splitter 30 is coupled to a cable modem 36. With basic embodiments of the splitter 30, the cable modem 36 receives the same input as the set top box 32 (e.g., receives the same television signals). With more complicated embodiments of the splitter 30, the cable modem 36 and the set top box 32 may receive different channels. Whether receiving the same or different channels from the splitter 30, a primary function of the cable modem 36 is to provide one or more ancillary devices 38 with access to the Internet 24. Examples of the ancillary device 38 can include, but not be limited to, PCs, wireless handheld devices, companion set top boxes, two-way advanced remote controls, or other browser-enabled display devices or client terminals that have the capability to communicate with the Internet 24.

Thus, for instance, the cable modem 36 can use the DOCSIS protocol to allow the user of the ancillary device 38 to "surf" the Internet, regardless of whether or not television programming is currently being concurrently displayed on the television 34. Indeed, many subscribers prefer to use cable modems as their method of access to the Internet 24, rather than or in addition to, a telephone modem, a digital subscriber line (DSL), and the like.

A disadvantage of most ancillary devices 38 that are capable of being connected to the cable modem 36 is that they cannot respond to and process interactive triggers and content in the same manner as the set top box 32. While it may be possible in the future to provide ancillary devices 38 with such capability at a reasonable price, most legacy ancillary devices 38 will "ignore" and will not process television signals that are accompanied by interactive content and other trigger information. Therefore, in order to enjoy the interactive television experience, the viewer is relegated to using a remote control in cooperation with the set top box 32, and cannot use a PC or other ancillary device 38 to experience interactivity with whatever television program is displayed on the television 34.

Accordingly, an embodiment of the invention provides an aggregator 40 that can aggregate trigger information that typically accompanies television broadcasts, which can include interactive content, URL and other addresses, hypertext markup language (HTML) pages, streaming media, files, and other information, and then provide such information to the cable modem 36 in a format that the ancillary devices 38 can process. The aggregated information can be collected/aggregated and at least some provided to the cable modem 36 concurrently (e.g., in "real-time") with the corresponding television program that is provided to the set top box 32 and the television 34, or at least some of the aggregated information can be provided at other times, such as in response to a request for the information sent from the ancillary device 38 (which may not necessarily be concurrent with the presentation of the television program on the television 34).

In accordance with an embodiment of the invention, the aggregator 40 can include a combination of hardware and software (such as one or more processors, one or more servers, databases and other storage media, software and other machine-readable instructions stored on a machine-readable medium, and so on) that delivers its aggregated content via at least one of the channels of the communication network 28, using the DOCSIS protocol as an example, to the ancillary devices 38 connected to the cable modem 36. The aggregator 40 can be located in the head-end 12 in one embodiment, while in other embodiments, the aggregator 40 can be located outside of the head-end 12, including somewhere in the Internet 24. In several example implementations where the aggregator 40 operates to provide URL addresses (or other interactive information peculiar to the Internet 24) to the ancillary devices 38, the aggregator 40 can be communicatively coupled to the CMTS 22 in accordance with an embodiment of the invention, so that the aggregator 40 can provide such information to the ancillary devices 38 via the CMTS 22. It is to be appreciated that the aggregator 40 need not necessarily be coupled to the CMTS 22 in some embodiments, so long as the aggregator 40 can deliver aggregated information that can be used by the ancillary device 38 and/or the set top box 32. For instance, the aggregator 40 can deliver the aggregated information to the ancillary devices 38 via a non-cable modem connection (such as telephone line, DSL, or other network different from the communication network 28) that the ancillary devices 38 may have with the Internet 24.

Various techniques can be used by the aggregator 40 to aggregate trigger information and to eventually provide this trigger information to the ancillary devices. Examples of these techniques are illustrated in the subsequent figures, and generally include direct network links from the unit 16 to the aggregator 40, direct feeds from content providers to the aggregator 40, receiving the trigger information from third-party entities, or receiving the trigger information from a collection of devices deployed in the system 10.

Figure 2:
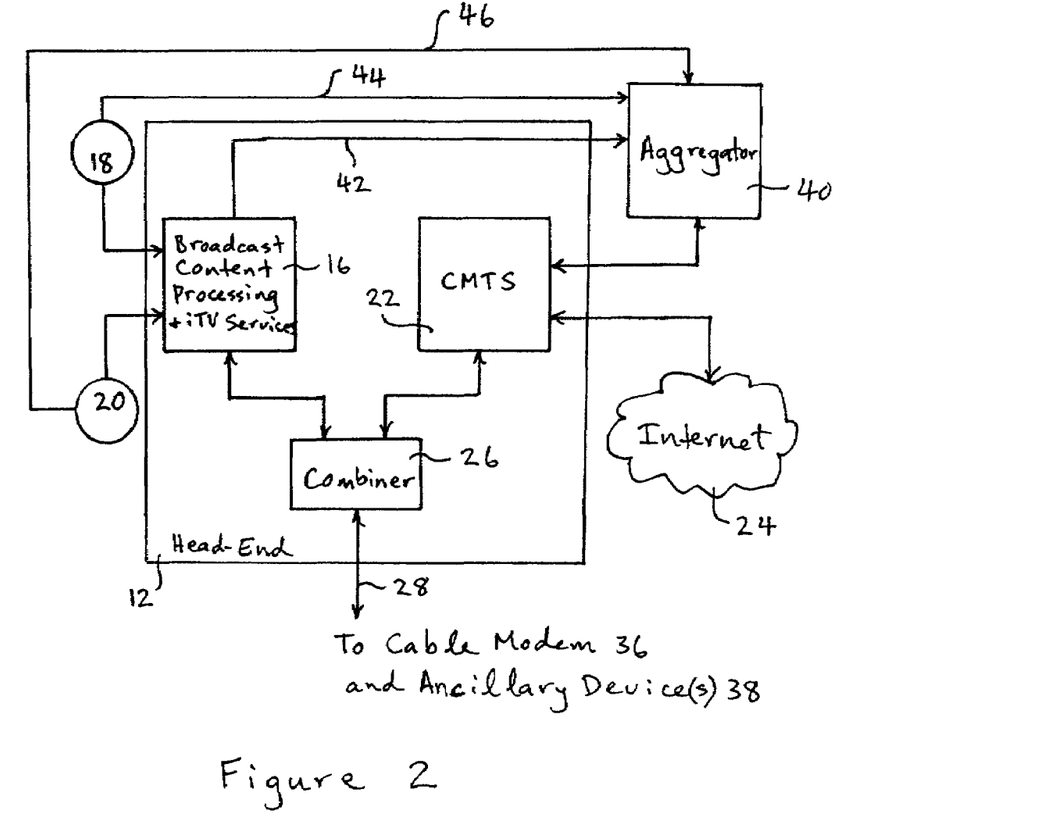
FIG. 2 is a block diagram illustrating examples of information aggregation techniques for the system of FIG. 1 in accordance with an embodiment of the invention.

FIG. 2 is a block diagram illustrating examples of information aggregation techniques for the system 10 of FIG. 1 in accordance with an embodiment of the invention. More specifically, FIG. 2 illustrates direct network link(s) 42 from the unit 16 to the aggregator 40, and direct feeds 44 and 46 from content providers (e.g., providers of national broadcast content and iTV content 18 and providers of local broadcast content and iTV content 20, respectively) to the aggregator 40.

With regards to the link 42, the unit 16 can provide trigger information and other related content directly to the aggregator 40. Because the unit 16 is coupled to receive television signals and information for eventual transmission via the channels of the communication network 28, the unit 16 can obtain trigger information from all incoming television signals where such interactive data is present. Such an embodiment of the link 42 can be implemented, for instance, in situations where the hardware and software of the unit 16 has extracted or otherwise obtained trigger information from content providers and/or television signals. Then, this trigger information can be provided directly to the aggregator 40 after the unit 16 has processed the information or otherwise configured the information to a format that is suitable for the ancillary devices 38.

When the aggregator 40 has received the information from the unit 16 (for one or more television signals), the information can be stored or aggregated in storage media in the aggregator 40. This aggregation at the aggregator 40 can involve activities such as recording characteristics related to the trigger information, such as the type of information received, the television program and channel that correspond to the information, the date and time of transmission, the expiration date(s) of the trigger information, and other such data. Afterwards, the aggregated information can be broadcasted, IP multicasted, or unicasted from the aggregator 40 to one or more client terminals in one or more subscriber residences 14. In accordance with an embodiment of the invention, the aggregated information can be sent to the ancillary device 38 by way of the CMTS 22, through a channel of the communication network 28 that uses the DOCSIS protocol, and then to the cable modem 36.

In accordance with an embodiment of the invention, the aggregated information can be transmitted (e.g., broadcast, multicast, or unicast) to the ancillary device 38 from the aggregator 40 in real-time and concurrently with television signals and related interactive content that are sent to the set top box 32. This allows the user of the ancillary device 38 to experience interactivity with the television program on the ancillary device 38 in the same manner as if interacting with the set top box 32 via a remote control. In an embodiment, this can be accomplished by transmitting trigger information in the form of URL addresses, files, streaming media, and other aggregated information (which have been suitably separated or extracted from the television signals) to the ancillary device 38. A software application, such as a web browser, of the ancillary device 38 can then navigate to the corresponding URL address or otherwise render the interactive content.

According to one embodiment, the browser of the ancillary device 38 can automatically navigate or render interactive content as it is received, one at a time, from the aggregator 40. In another embodiment, the received interactive content can be cached locally and labeled, so that the user of the ancillary device 38 can have more control over the identification and selection of which interactive content to access, as well as customize the presentation of that content.

Alternatively or in addition, the aggregator 40 can store the aggregated information at a storage location having a URL address, IP address, or other network address (including an address located at the Internet 24). Then, such information can be provided to the ancillary device 38 in response to a specific request for the aggregated information from a software application of the ancillary device 38 (e.g., a web browser "HTTP get"), as compared to automatic transmission of the aggregated information to the ancillary device 38. This embodiment allows the user of the ancillary device 38 to access the interactive content during times after the original transmission of the corresponding television signal(s).

With regards to the direct feeds 44 and 46 of FIG. 2, the content providers can provide information directly to the aggregator 40. The information provided to the aggregator 40 via the direct feeds 44 and 46 can include trigger information that is included along with the television signals (e.g., before insertion into the VBI), or the information can include enhanced or additional interactive content than what is provided along with the television signals designated for the set top box 32. In an embodiment, the information provided via the direct feeds 44 and 46 to the aggregator 40 can be pre-formatted or pre-configured by the content providers in a manner that is recognizable to the ancillary devices 38. Illustrative examples of the information that can be provided to the aggregator 40 via the direct feed 44 include a baseball player's statistics, streaming video highlight clips, URL links to feature articles and publications, and other information from a network (such as ESPN or other content provider) that is currently broadcasting a baseball game.

Once the information is received via the direct feeds 44 and 46, the aggregator 40 can aggregate and deliver the information to the ancillary devices 38 via the techniques described above for the direct link 42 from the unit 16. It is to be appreciated that in one embodiment, both the direct link 42 and the direct feeds 44 and 46 may be used to provide trigger information and other interactive content to the aggregator 40.

Figure 3:
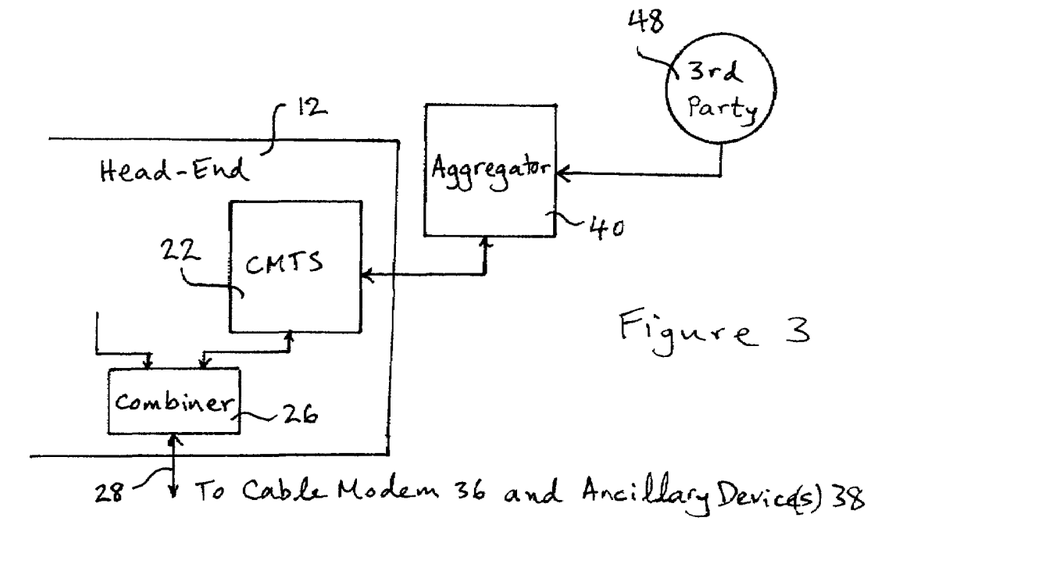
FIG. 3 is a block diagram illustrating an example of an information aggregation technique for the system of FIG. 1 in accordance with another embodiment of the invention.

FIG. 3 is a block diagram illustrating an example of an information aggregation technique for the system 10 of FIG. 1 in accordance with another embodiment of the invention. In the embodiment of FIG. 3, a third-party entity 48 provides interactive information to the aggregator 40. An example of the third-party entity 48 can include a service that provides customized or enhanced content or other trigger information to accompany broadcast television signals. For instance, the third-party entity 48 can provide enhanced sports statistics to accompany a broadcast of a game or detailed news information to accompany a standard news broadcast.

The information provided by the third-party entity 48 to the aggregator 40 can be pre-formatted or pre-configured by the third-party entity 48 in a manner that is recognizable to the ancillary devices 38. Moreover, once the information is received from the third-party entity 48, the aggregator 40 can aggregate and deliver the information to the ancillary devices 38 via the techniques described above for the aggregation techniques illustrated in FIG. 2. It is to be appreciated that in one embodiment, both the aggregation techniques of FIGS. 2 and 3 may be used to provide trigger information and other interactive content to the aggregator 40.

Figure 4:
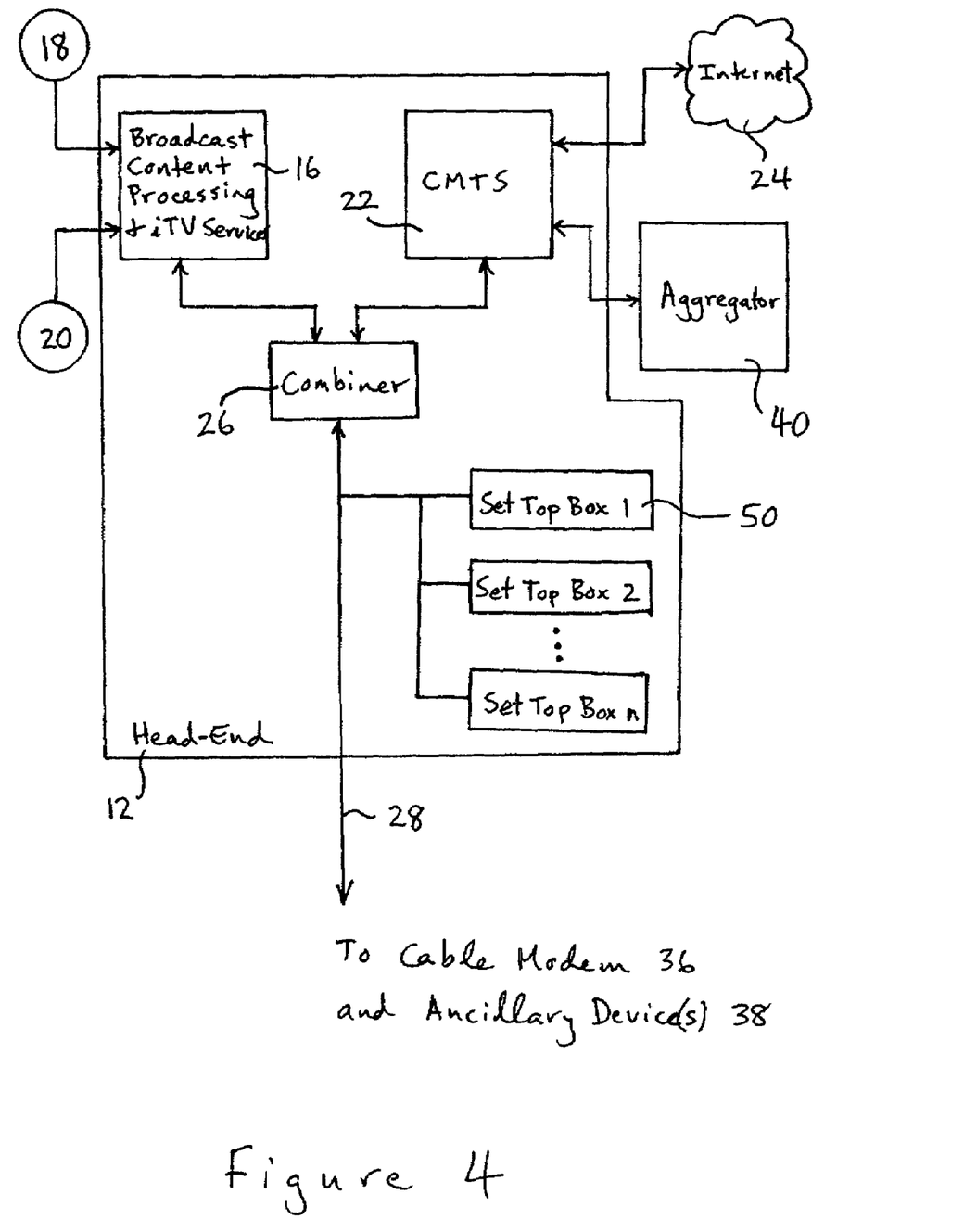
FIG. 4 is a block diagram illustrating an example of an information aggregation technique for the system of FIG. 1 in accordance with another embodiment of the invention.

Another technique to aggregate trigger information uses a collection of devices deployed in the system 10. FIG. 4 is a block diagram illustrating a first example of an information aggregation technique for the system 10 of FIG. 1 that uses collection devices in accordance with an embodiment of the invention. A plurality of collection devices 50 is collocated in the head-end 12 and is coupled downstream from the combiner 26, such that each of the collection devices 50 is tuned to a specific channel of the communication network 28 and receives the television signal and accompanying interactive content available on that channel.

In an embodiment of the invention, the collection devices 50 comprise a bank of set top boxes, similar to the set top box 32 or similar to set top boxes that have built-in cable modems. There can be up to n set top boxes in the collection devices 50, with n being the total number of channels monitored. Because these set top boxes can include similar hardware and software as the set top box 32, they have the capability to detect, extract, and process trigger information that is present in the respective channels that they monitor. These set top boxes can then provide this trigger information to the aggregator 40, which can subsequently provide the trigger information to the ancillary devices 38 using techniques described above for FIGS. 2-3. Use of set top boxes for the collection devices 50 in this manner is advantageous in that collection of trigger information can be controlled by the cable service provider, MSO, or other entity that operates the head-end 12. Furthermore, suitable set top boxes are readily available without having the need to design new devices and are relatively inexpensive compared to the large number of potentially serviceable subscribers.

Operation of the embodiment of FIG. 4 to aggregate trigger information is as follows. Initially, each collection device 50 is tuned to a specific channel so as to monitor and obtain the trigger information available on that channel. After each collection device 50 obtains their respective trigger information, each collection device 50 delivers/transmits their trigger information upstream to the aggregator 40 via the CMTS 22 and via use of the DOCSIS protocol. The aggregator 40 then aggregates the trigger information received from the collection devices 50 in a manner similar to that described above for the embodiments of FIGS. 2-3. Subsequently, the aggregated information is delivered by the aggregator 40 to the ancillary devices 38 via the CMTS 22, a DOCSIS channel of the communication network 28, and the cable modem 36, also in a manner similar to that described above for the embodiments of FIGS. 2–3.

Figure 5:
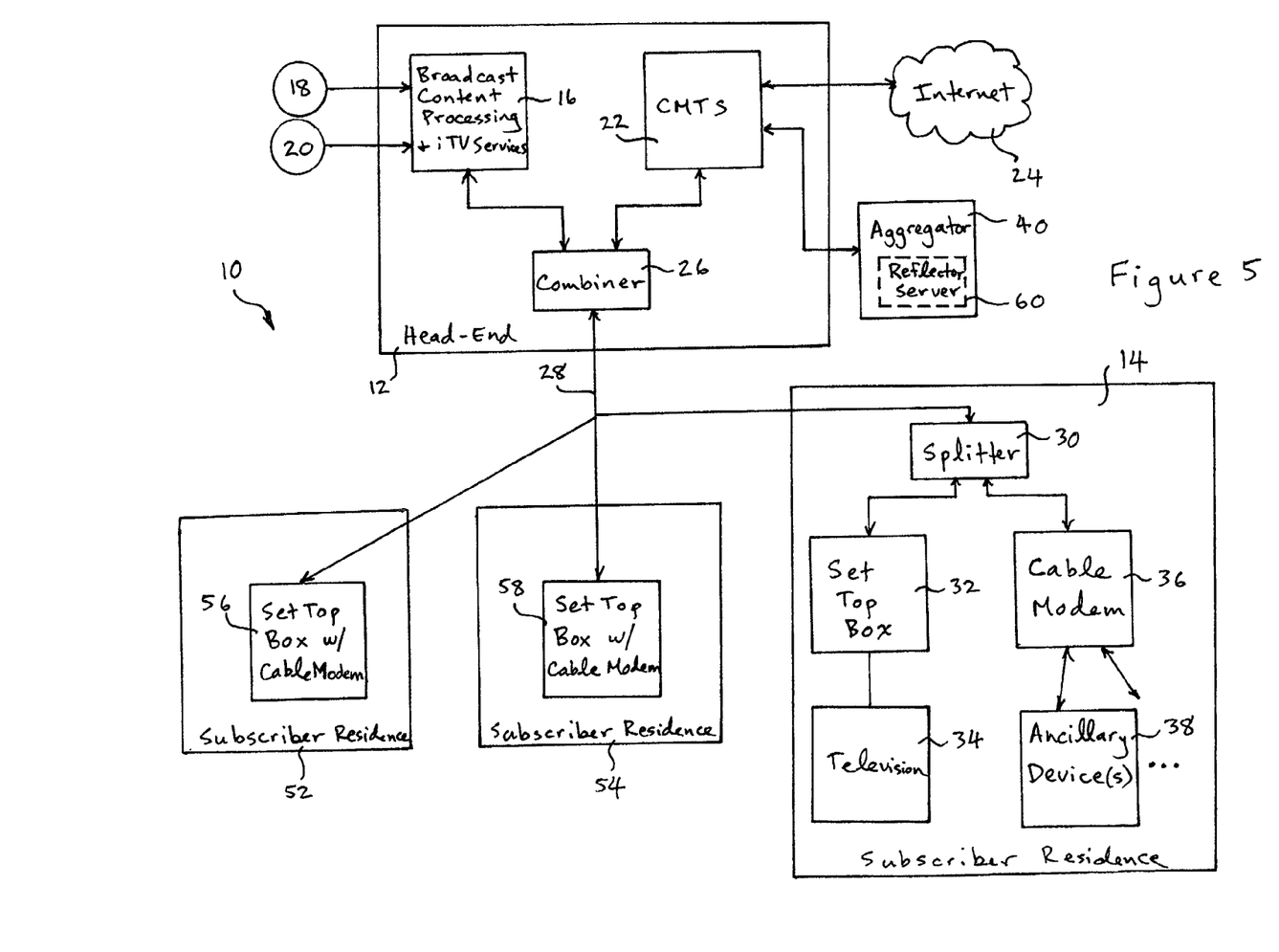
FIG. 5 is a block diagram illustrating an example of an information aggregation technique for the system of FIG. 1 in accordance with another embodiment of the invention.

FIG. 5 is a block diagram illustrating a second example of an information aggregation technique for the system 10 of FIG. 1 that uses collection devices in accordance with an embodiment of the invention. In the embodiment of FIG. 5, set top boxes at various subscriber residences act as the "collection devices" and the aggregator 40 acts as a "reflector." The embodiment of FIG. 5 is advantageous in that it can use set top boxes that are already deployed at subscriber residences to assist in providing trigger information to ancillary devices that may be located anywhere in the system 10, rather than having to specifically deploy dedicated and complicated collection devices.

In FIG. 5, additional subscriber residences 52 and 54 connected to the communication network 28 are shown. The subscriber residences 52 and 54 include set top boxes 56 and 58, respectively, that are capable of two-way communication with the head-end 12. Examples of such set top boxes 56 and 58 with two-way communication capability include set top boxes with built-in cable modems. It is to be appreciated that set top boxes that do not necessarily have built-in cable modems, such as the set top box 32, may also be capable of two-way communication with the head-end 12 and thus may be implemented as collection devices in a manner that will be described next.

The residence 14, having the set top box 32 and the ancillary device(s) 38, is also shown FIG. 5. In accordance with an embodiment of the invention, the set top boxes 56 and 58 (as well as possibly the set top box 32) can work in conjunction with a reflector server 60 of the aggregator 40 as a distributed aggregator service for ancillary devices 38. An example operation of the information aggregation technique of FIG. 5 is illustrated by a flowchart of FIG. 6. Components of the flowchart of FIG. 6 can be embodied in software or other machine-readable instructions stored on a machine-readable medium. The machine-readable medium can be located in the aggregator 40 in one embodiment, or it may be located at other suitable location or locations in the system 10.

Figure 6:
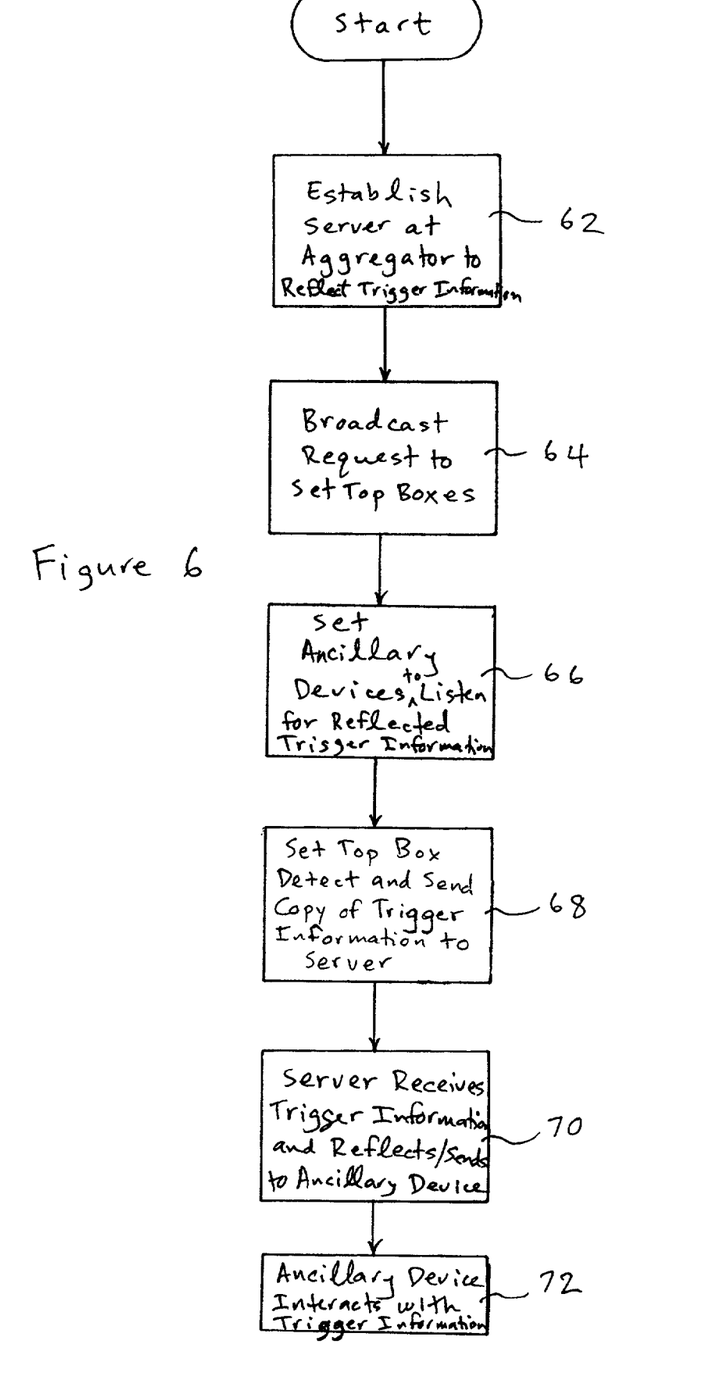
FIG. 6 is a flowchart further illustrating an example operation of the information aggregation technique of FIG. 5.

Beginning first at a block 62, the reflector server 60 is established at the aggregator 40 or at some other suitable location (such as in the head-end 12) that is communicatively coupled to the CMTS 22. In an embodiment of the invention, the reflector server 60 can comprise a web server that can communicate with the set top boxes 56 and 58 via a DOCSIS channel connection to their cable modems. The reflector server 60 operates as a "reflector" of trigger information that is received from the set top boxes 56 and 58, and to be provided to one or more ancillary devices 38.

Next at a block 64, the reflector server 60 broadcasts an initiation request to client terminals to begin responding with trigger information. In an embodiment of the invention, this request is broadcast such that it is received by all client terminals that are in communication with the reflector server 60 via DOCSIS channels, whether or not such client terminals have the capability to recognize and/or respond to the request. For the client terminals that can recognize and respond to the request, such as the set top boxes 56 and 58, such client terminals are set to detect trigger information (or otherwise obtain the trigger information from the television signals) and to send such detected trigger information to the reflector server 60. Meanwhile at a block 66, ancillary devices 38 are set to "listen" for trigger information that is to be reflected from the reflector server 60.

At a block 68, any time one of the set top boxes 56 or 58 detects trigger information and after waiting a period of time (and no other set top box has already sent that trigger information to the reflector server 60) in an embodiment, a copy of the trigger information is made and is transmitted to the reflector server 60. The purpose of having the set top box wait for the period of time before sending the trigger information to the reflector server 60 is to avoid a "datastorm" of identical trigger information back to the reflector server 60. Thus, the reflector server 60 need not be inundated with multiple copies of the same trigger information.

Moreover according to an embodiment of the invention, while the set top boxes 56 and 58 are waiting for the period of time after detecting a particular trigger information, these set top boxes are also "listening" for the same trigger information from the reflector server 60. Accordingly, if any one of the set top boxes has already previously sent that trigger information to the reflector server 60 and the reflector server 60 has subsequently reflected/broadcasted that same trigger information to all client terminals, then other set top boxes can identify this condition when they receive that same trigger information and can refrain from sending that same trigger information to the reflector server 60.

Next at a block 70, the reflector server 60 receives the trigger information sent from any one of the set top boxes 56 or 58, and reflects/sends that trigger information to the ancillary device 38 via the DOCSIS channel, such as via an IP multicast. At the block 70, the reflector server 60 may perform other operations, such as logging the trigger information, gathering viewer statistics related to the received trigger information (e.g., data indicative of the location of the set top box that sent the trigger information, date and time received, the television program corresponding to the trigger information, and the like), or accumulating data for a database of programming content (e.g., data on re-runs or re-broadcasts of the same content). Furthermore, the reflector server 60 need not simply reflect the trigger information to the ancillary devices 38. In an embodiment, the reflector server 60 can perform substitutions, deletions, additions, or other revisions to the received trigger information, and then send the revised trigger information to the ancillary devices 38.

At a block 72, the ancillary devices 38 receive the trigger information that is reflected from the reflector server 60 and interacts with the received trigger information. In an embodiment, the ancillary devices 38 can receive the trigger information on a user datagram protocol (UDP) port. If the ancillary device 38 comprises a companion set top box, the companion set top box can compare the trigger information's channel identifier with the channel currently viewed on the television 34. If there is a match, then the trigger information is activated. Otherwise, the trigger information can be discarded.

The embodiment of FIGS. 5–6 is advantageous in that trigger information aggregation is performed on the interactive content at substantially the same time that it is being viewed. This reduces the number of mismatches between time zones, channel lineups, and the like.

In conclusion, the interactive information aggregator 40 is provided for off-broadcast access to trigger information. The aggregator 40 can be implemented in the interactive television system 10 so as to perform real-time capture and aggregation of trigger information through cooperation with content providers, use of a network of collection devices 50 deployed in the interactive television system 10, or generation of trigger information by third-party entities 48, or a combination of these resources. The aggregated information can then be made available to ancillary devices 38 used by viewers, independently of being provided to the set top box 32 and the television 34. For instance, the aggregated information can be provided to ancillary devices 38 that do not have direct access or capability to process television broadcast signals. This provides users of the ancillary devices 38 with the capability to participate in an interactive television experience where they would otherwise not have such interactive capability.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

For instance, while the various figures and accompanying description illustrate set top boxes and ancillary devices 38 as being present and used in subscriber residences, it is to be appreciated that such devices can be used in other locations where interactive television reception is available, such as offices, libraries, schools, airports, and so on. Therefore, the invention is not limited by the specific location of any one of the ancillary devices 38 and/or set top boxes. Furthermore, while the various figures illustrate only a single set top box and ancillary device in each subscriber residence, it is to be appreciated that there may be multiple numbers of these devices in any one location. Moreover, multiple set top boxes in a single subscriber residence can provide the distributed collection device embodiment such as that illustrated in FIG. 5.

Additionally, while the terms "aggregation" or "aggregator" is used throughout this description and in the claims, these terms are not intended to necessarily require a timing element or time constraint. That is, in some embodiments, "aggregation" or "aggregator" can include situations where trigger information is collected by the aggregator 40 and then delivered to the ancillary devices 38 without any substantive time delay caused by storage prior to delivery. In effect, the trigger information is delivered to the ancillary devices 38 in what appears to be real time to the viewer. In other embodiments, "aggregation" or "aggregator" can include situations where the trigger information is actually collected and stored for later delivery, such as in response to the viewer's browser request for the trigger information, and hence a timing element can be involved.

Moreover, alternatively or in addition to a cable distribution system, a satellite television (TV) delivery system may be implemented. A satellite TV delivery system may comprise a direct broadcast satellite (DBS) system. A DBS system may comprise a small 18-inch satellite dish (which is an antenna for receiving a satellite broadcast signal); a digital integrated receiver/decoder (IRD), which separates each channel, and decompresses and translates the digital signal so a television can show it; and a remote control. Programming for a DBS system may be distributed, for example, by multiple high-power satellites in geosynchronous orbit, each with multiple transponders. Compression (e.g., MPEG) is used to increase the amount of programming that can be transmitted in the available bandwidth.

A digital broadcast center may be used to gather programming content, ensure its digital quality, and transmit the signal up to the satellites. Programming may come to the broadcast center from content providers (TBS, HBO, CNN, ESPN, etc.) via satellite, fiber optic cable and/or special digital tape. Satellite-delivered programming is typically immediately digitized, encrypted and uplinked to the orbiting satellites. The satellites retransmit the signal back down to every earth-station—or, in other words, every compatible DBS system receiver dish at customers' homes and businesses. In one embodiment, therefore, the communication network 28 comprises this satellite communication link to the subscriber residences 14.

Some programs may be recorded on digital videotape in the broadcast center to be broadcast later. Before any recorded programs are viewed by customers, technicians may use post-production equipment to view and analyze each tape to ensure audio and video quality. Tapes may then be loaded into a robotic tape handling systems, and playback may be triggered by a computerized signal sent from a broadcast automation system. Back-up videotape playback equipment may ensure uninterrupted transmission at all times.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
    sending one or more television signals, including trigger information related to content of the television signals, to a first client terminal via a first channel of a communication network;
    aggregating at least some of the trigger information related to the content of the sent television signals; and
    sending at least some of the aggregated trigger information separate from the content of the television signals to a second client terminal via a second channel of the communication network;
    wherein aggregating the trigger information related to the content of the television signals includes receiving the trigger information from a plurality of collection devices that have the capability to detect and extract trigger information in the sent television signals.

2. The method of claim 1 wherein aggregating the trigger information related to the content of the sent television signals includes extracting the trigger information from the television signals.

3. The method of claim 1 wherein aggregating the trigger information related to the content of the television signals includes receiving at least a portion of the trigger information via a direct feed from a source of the television signals.

4. The method of claim 1 wherein aggregating the trigger information related to the content of the television signals includes receiving at least a portion of the trigger information from a third-party entity.

5. The method of claim 1 wherein aggregating the trigger information related to the content of the television signals includes receiving at least a portion of the trigger information from a unit that processes the television signals.

6. The method of claim 1, further comprising sending at least some of the aggregated trigger information to the second client terminal via a network different from the communication network.

7. The method of claim 1 wherein the plurality of collection devices includes a bank of set top boxes that are not deployed to subscriber residences, the method further comprising:
    tuning each set top box to a channel corresponding to a television signal;
    using the set top boxes to obtain trigger information from the television signal on the respective channels to which the set top boxes are tuned; and
    aggregating the trigger information obtained by the set top boxes and sending the aggregated trigger information to the second client terminal.

8. The method of claim 1 wherein the plurality of collection devices includes a plurality of client terminals deployed in subscriber residences, the method further comprising:
    requesting the deployed client terminals to send trigger information;
    for the deployed client terminals, determining whether the trigger information to send has been previously sent;
    if the trigger information is determined to have not been previously sent, sending a copy of the trigger information from at least one of the deployed client terminals; and
    receiving the copy of the trigger information sent from the at least one of the deployed client terminals and delivering the trigger information to the second client terminal.

9. The method of claim 1 further comprising modifying the trigger information received from the collection device, prior to sending that trigger information to the second client terminal.

10. An article of manufacture, comprising:
    a machine-readable medium having machine-executable instructions stored thereon to:
    aggregate at least some trigger information related to content of television signals that are sent to a first client terminal via a first channel of a communication network; and
    send at least some of the aggregated trigger information separate from the content of the television signals to a second client terminal via a second channel of the communication network,
    wherein the instructions to aggregate at least some trigger information related to the content of the television signals include instructions to receive the trigger information from a plurality of collection devices that are each tuned to a channel corresponding to a television signal and have the capability to detect and extract trigger information in the television signals.

11. The article of manufacture of claim 10 wherein the machine-readable medium further includes instructions stored thereon to:
receive the trigger information from each of the collection devices, the collection devices capable to obtain the trigger information from the television signal on the respective channels to which the collection devices are tuned; and
aggregate the trigger information received from the collection devices and send the aggregated trigger information to the second client terminal.

12. The article of manufacture of claim 10 wherein the plurality of collection devices is comprised of deployed client terminals, the machine-readable medium further including instructions stored thereon to:
request the deployed client terminals to send trigger information;
determine whether the trigger information to send has been previously sent by any one of the deployed client terminals;
if the trigger information is determined to have not been previously sent, receive a copy of the trigger information sent from at least one of the deployed client terminals; and
deliver the trigger information to the second client terminal.

13. The article of manufacture of claim 10 wherein the machine-readable medium further includes instructions stored thereon to modify the trigger information prior to sending the trigger information to the second client terminal.

14. An apparatus, comprising:
an aggregator communicatively coupled to a broadcast center of an interactive television system, the aggregator capable to aggregate at least some trigger information related to content of television signals that are sent from the broadcast center to a first client terminal via a first channel of a communication network of the interactive television system, the aggregator further capable to receive the trigger information from a plurality of collection devices and send at least some of the aggregated trigger information separate from the content of the television signals to a second client terminal via a second channel of the communication network.

15. The apparatus of claim 14 wherein the collection devices include a plurality of client terminals deployed in different subscriber residences, and wherein the aggregator includes a server to direct trigger information, received from the deployed client terminals, to the second client terminal.

16. The apparatus of claim 14 wherein the plurality of collection devices comprises set top boxes deployed at the broadcast center to receive the television signals and extract the trigger information from the television signals, and wherein the aggregator includes an input to receive the trigger information from the set top boxes.

17. An interactive television system, comprising:
a broadcast center to send television signals, along with trigger information related to content of the television signals, to a first client terminal via a first channel of a communication network coupled to the broadcast center;
an aggregator communicatively coupled to the broadcast center, the aggregator capable to aggregate at least some of the trigger information related to the content of television signals that are sent from the broadcast center to the first client terminal, the aggregator further capable to send at least some of the aggregated trigger information separate from the content of the television signals to a second client terminal via a second channel of the communication network; and
a unit disposed in the broadcast center to process the television signals that are sent to the first client terminal and to provide the trigger information related to the content of the sent television signals to the aggregator.

18. The system of claim 17, further comprising a direct feed from a source of the television signals to the aggregator to provide at least a portion of the trigger information to the aggregator.

19. The system of claim 17, further comprising a third-party service to provide at least a portion of the trigger information to the aggregator.

20. The system of claim 17, wherein the unit comprises a plurality of collection devices to provide the trigger information to the aggregator.

21. The system of claim 20 wherein the plurality of collection devices includes a bank of set top boxes communicatively coupled to the broadcast center and to the aggregator, the set top boxes being tuned to a channel corresponding to a television signal and capable to obtain trigger information from the television signal on the respective channels to which the set top boxes are tuned, the aggregator capable to receive the trigger information obtained by the set top boxes and to send the aggregated trigger information to the second client terminal.

22. The system of claim 20 wherein the plurality of collection devices includes a plurality of deployed client terminals coupled to the communication network, the aggregator capable to request the deployed client terminals to send trigger information that the client terminals receive, the deployed client terminals capable to determine whether the trigger information to send has been previously sent to the aggregator, at least one of the deployed client terminals capable to send a copy of the trigger information if the trigger information is determined to have not been previously sent, the aggregator capable to receive the copy of the trigger information sent from the at least one of the deployed client terminals and to deliver the trigger information to the second client terminal.

23. A method, comprising:
sending one or more television signals, including trigger information related to content of the television signals, to a first client terminal via a first channel of a communication network;
aggregating at least some of the trigger information related to the content of the sent television signals, wherein aggregation of the trigger information includes:
requesting client terminals that have been deployed in different subscriber residences to send trigger information obtained from the television signals and
receiving the trigger information from at least one of the deployed client terminals; and
sending at least some of the aggregated trigger information to a second client terminal via a second channel of the communication network.

24. The method of claim 23, further comprising modifying the copy of the trigger information received from the deployed client terminal, prior to sending that trigger information to the second client terminal.

25. The method of claim 23, further comprising receiving the trigger information from at least one of a source of the television signal, a third-party entity, or a plurality of collection devices.

26. An interactive television system, comprising:
a broadcast center to send television signals, along with information related to content of the television signals, to a first client terminal via a first channel of a communication network coupled to the broadcast center;
an aggregator communicatively coupled to the broadcast center, the aggregator capable to aggregate at least some of the trigger information related to the content of television signals that are sent from the broadcast center to the first client terminal, the aggregator further capable to send at least some of the aggregated trigger information separate from the content of the television signals to a second client terminal via a second channel of the communication network; and
a plurality of set top boxes communicatively coupled to the broadcast center and to the aggregator, the set top boxes being tuned to a channel corresponding to a television signal and capable to obtain trigger information from the television signal on the respective channels to which the set top boxes are tuned, the aggregator capable to receive the trigger information obtained by the set top boxes and to send the aggregated trigger information to the second client terminal.

27. The system of claim 26 wherein the set top boxes include a cable modem capable to transmit the trigger information obtained from the television signal to the aggregator.

28. The system of claim 26 wherein the set top boxes are coupled to the communication network to receive the television signals available on a plurality of channels of the communication network.

29. A method, comprising:
sending one or more television signals, including trigger information related to content of the television signals, to a first client terminal via a first channel of a communication network having a plurality of different channels, the communication network comprising a portion of an interactive television network through which the television signals may be distributed to the first client terminal, the trigger information including addresses where data regarding the content of the television signals may be accessed from a network different from the communication network;
aggregating at least some of the trigger information related to the content of the sent television signals, including obtaining the trigger information from the television signals and storing the obtained trigger information in a storage medium, wherein storing the obtained trigger information in the storage medium includes recording characteristics related to the trigger information; and
sending at least some of the aggregated trigger information to a second client terminal via a second channel of the communication network, the second channel of the communication network being different from the first channel and capable to use a communication protocol different from a communication protocol used on the first channel, the second client terminal being a different type of terminal than the first client terminal and capable to process the aggregated trigger information separately from trigger information processed by the first client terminal.

30. The method of claim 29 wherein the aggregated trigger information is capable of being received from deployed client terminals, the method further comprising:
requesting the deployed client terminals to send trigger information;
for the deployed client terminals, determining whether the trigger information to send has been previously sent;
if the trigger information is determined to have not been previously sent, sending a copy of the trigger information from at least one of the deployed client terminals; and
receiving the copy of the trigger information sent from the at least one of the deployed client terminals and delivering the trigger information to the second client terminal.

31. An interactive television system, the system comprising:
a broadcast center to send television signals, along with information related to content of the television signals, to a first client terminal via a first channel of a communication network coupled to the broadcast center, the first channel being one of a plurality of channels of the communication network capable to carry television signals, the first client terminal being communicatively coupled to the communication network to allow the television signals to be provided to the first client terminal via the communication network; and
an aggregator communicatively coupled to the broadcast center, the aggregator capable to aggregate at least some of the trigger information related to the content of television signals that are sent from the broadcast center to the first client terminal, including being capable to obtain the trigger information from the television signals and to store the obtained trigger information in a storage medium coupled to the aggregator, wherein storage of the obtained trigger information in the storage medium includes recordation of characteristics related to the trigger information in the storage medium, the aggregator further capable to send at least some of the aggregated trigger information separate from the content of the television signals to a second client terminal via a second channel of the communication network, the second client terminal being a different type of terminal than the first client terminal, the second channel capable to use a communication protocol different than a communication protocol on the first channel for the aggregated trigger information sent to the second client terminal, the second client terminal capable to process the aggregated trigger information separately from trigger information processed by the first client terminal.

32. The system of claim 31, further comprising a plurality of set top boxes communicatively coupled to the broadcast center and to the aggregator, the set top boxes being tuned to a channel corresponding to a television signal and capable to obtain trigger information from the television signal on the respective channels to which the set top boxes are tuned, the aggregator capable to receive the trigger information obtained by the set top boxes and to send the aggregated trigger information to the second client terminal.

* * * * *